United States Patent
Chen et al.

(10) Patent No.: US 9,233,852 B2
(45) Date of Patent: Jan. 12, 2016

(54) METHOD OF PRODUCING HIGHLY DISPERSED GRAPHENE ORGANIC DISPERSION AND APPLICATION THEREOF

(71) Applicant: KUN SHAN UNIVERSITY, Tainan (TW)

(72) Inventors: Jean-Hong Chen, Tainan (TW);
Yao-Wei Huang, Tainan (TW);
Shao-Yan Jhang, Tainan (TW);
Yan-Cheng Chen, Tainan (TW);
Lung-Chuan Chen, Tainan (TW)

(73) Assignee: KUN SHAN UNIVERSITY, Tainan (TW)

( * ) Notice: Subject to any disclaimer, the term of this patent is extended or adjusted under 35 U.S.C. 154(b) by 24 days.

(21) Appl. No.: 14/271,444

(22) Filed: May 6, 2014

(65) Prior Publication Data

US 2015/0158730 A1    Jun. 11, 2015

(30) Foreign Application Priority Data

Dec. 6, 2013  (TW) .............................. 102144732 A

(51) Int. Cl.
*C01B 31/04* (2006.01)

(52) U.S. Cl.
CPC ......... *C01B 31/0484* (2013.01); *C01B 2204/28* (2013.01)

(58) Field of Classification Search
CPC   C01B 31/0484; C01B 2204/28; C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/30; C01B 2204/32
USPC ........................................................ 423/448
See application file for complete search history.

(56) References Cited

U.S. PATENT DOCUMENTS

2010/0028681  A1*  2/2010  Dai et al. ...................... 428/408

OTHER PUBLICATIONS

Hernandez, et al., High-yield production of graphene by liquid-phase exfoliation of graphite, Nature Nanotechnology 2008; 3: 563-568.*

* cited by examiner

*Primary Examiner* — Daniel C McCracken
(74) *Attorney, Agent, or Firm* — CKC & Partners Co., Ltd.

(57) ABSTRACT

A highly dispersed graphene organic dispersion and an application thereof are provided. A mixture is firstly provided, which includes a graphite material and an organic solvent. And then, the mixture is subjected to a peeling process at high temperature and high pressure, thereby obtaining the highly dispersed graphene organic dispersion. The highly dispersed graphene organic dispersion contains 75% or more of a single-layered graphene.

7 Claims, 6 Drawing Sheets

METHOD OF PRODUCING HIGHLY DISPERSED GRAPHENE ORGANIC DISPERSION AND APPLICATION THEREOF

RELATED APPLICATIONS

This application claims priority to Taiwan Application Serial Number 102144732, filed on Dec. 6, 2013, which is herein incorporated by reference.

BACKGROUND

1. Field of Invention

The present invention relates to a method of producing graphene. More particularly, the present invention relates a method of producing a highly dispersed graphene organic dispersion.

2. Description of Related Art

With technological advances, lighter and thinner electrical products are developed with technological advances for satisfying the requirements of customers.

For satisfying those technological requirements, graphene and its application become more and more important. Graphene is a two-dimensional carbon material and it has a sheet structure with six-ring hive-like crystals. In graphene, carbon atoms are formed to a two dimension carbon material that has single atomic layers with $sp^2$ covalent bond, and the graphene has a better carrier mobility, hardness, thermal conductivity, current loading ability and specific surface area. Thus, the graphene is used to produce technical product of the new generation.

The conventional methods of producing the graphene are described as following methods (1) to (4). (1) The graphene is easily and quickly obtained by peeling mechanically a graphite material. (2) The graphene is formed on nickel sheet or copper sheet by a chemical vapor deposition method or an epitaxy growth method introduced with hydrocarbon gas sources that are thermally decomposed. (3) The graphene is grown on an insulator substrate. (4) Graphene oxide, which is formed by intercalation with an acidic organic solvent, is reduced to the graphene.

However, the graphene can be obtained quickly by the aforementioned method (1), the graphene has single-layered and multi-layered structure, and the graphene is merely made in a little-scale production. Moreover, the uniformity and thickness of the graphene are hardly controlled by the method (2), so the resulted graphene has low quality. Furthermore, the cost of the method (3) is too expensive, and the method (3) is only available to produce the graphene with a small area. In addition, a reaction time of the method (4) is too long, and the resulted graphene often has structural defects, thereby lowering the quality of the graphene.

Accordingly, there is a need to provide a method of producing a highly dispersed graphene organic dispersion and an application thereof, for improving the deficiencies of the conventional method of producing the highly dispersed graphene organic dispersion and the application thereof.

SUMMARY

Therefore, an aspect of the present invention provides a method of producing a highly dispersed graphene organic dispersion. The highly dispersed graphene organic dispersion is fabricated by a peeling process.

Another aspect of the present invention provides a highly dispersed graphene organic dispersion. The highly dispersed graphene organic dispersion is produced by the aforementioned method.

A further aspect of the present invention provides a graphene material. The graphene material includes a substrate layer and a graphene layer, and the graphene layer is formed by the aforementioned highly dispersed graphene organic dispersion.

According to the aforementioned aspect of the present invention, the method of producing the highly dispersed graphene organic dispersion is provided. In one embodiment, a mixture is firstly provided. The mixture includes a graphene material and an organic solvent, and a solid content of the mixture is 0.001 mg/ml to 10.0 mg/ml.

Then, a peeling process is performed to the mixture. A peeling step is firstly performed in a closed reaction tank at a first temperature for 10 minutes to 4 hours, so as to form a graphene solution. The first temperature is more than 5° C. to 50° C. above a boiling point of the organic solvent.

And then, a dispersing step is performed to the aforementioned graphene solution at a second temperature, so as to form a highly dispersed graphene solution. The second temperature is 5° C. to 40° C. The highly dispersed graphene organic dispersion contains 75% or more of a single-layered graphene according to the total amount of all types of graphene, and the all types of graphene contain the single-layered graphene and multi-layered graphene.

According to one embodiment of the present invention, the aforementioned organic solvent includes but is not limited an alkene solvent, a halogenated alkene solvent having 3 to 8 carbon atoms, an aromatic solvent having 6 to 9 carbon atoms, a halogenated aromatic solvent having 6 to 9 carbon atoms and any combination thereof.

According to another embodiment of the present invention, the aforementioned mixture can optionally include a biphenyl compound. Based on the graphite material as 100 parts by weight, an amount of the biphenyl compound is 0 to 2 parts by weight.

According to yet another embodiment of the present invention, the aforementioned biphenyl compound is an olefinic biphenyl compound.

According to yet another embodiment of the present invention, a molecular weight of the biphenyl compound is 150 to 430.

According to yet another embodiment of the present invention, the aforementioned first temperature is higher than the boiling point of the organic solvent for 5° C. to 30° C.

According to yet another embodiment of the present invention, the aforementioned peeling step is performed for 30 minutes to 4 hours.

According to another aspect of the present invention, the highly dispersed graphene organic dispersion is provided. In one embodiment, the highly dispersed graphene organic dispersion is fabricated by the aforementioned method. The highly dispersed graphene organic dispersion contains 75% or more of a single-layered graphene according to the total amount of all types of graphene, and the all types of graphene contain the single-layered graphene and multi-layered graphene.

According to the further aspect of the present invention, a graphene material is provided. In one embodiment, the graphene material includes a substrate layer and a graphene layer. The graphene layer is disposed on at least one surface of the substrate layer, and the graphene layer is produced by subjecting the aforementioned highly dispersed graphene organic dispersion to a coating process.

The highly dispersed graphene organic dispersion of the present invention is produced by the peeling process. The highly dispersed graphene organic dispersion contains 75% or more of a single-layered graphene according to the total amount of all types of graphene, and the all types of graphene contain the single-layered graphene and multi-layered graphene. The highly dispersed graphene organic dispersion still has a better ageing stability after standing days.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
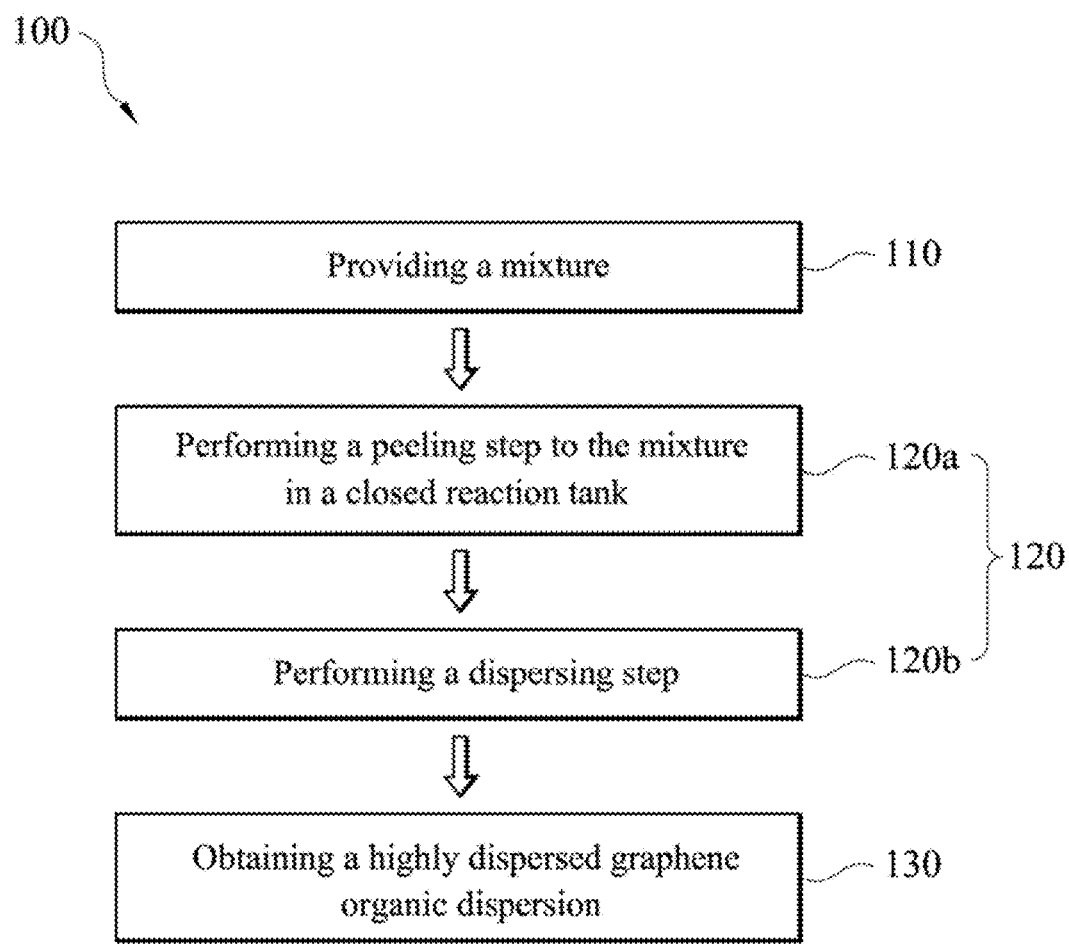
FIG. 1 is a flow chart of a method of producing a highly dispersed graphene organic dispersion according to one embodiment of the present invention.

Reference is made to FIG. 1, which is a flow chart of a method 100 of producing a highly dispersed graphene organic dispersion according to one embodiment of the present invention. In one embodiment, a mixture is firstly provided as shown in a process 110. The mixture includes a graphite material and an organic solvent, and the mixture does not comprise a surfactant. A solids content (that is the content of the graphite material in the mixture) is 0.001 mg/ml to 10.0 mg/ml.

When the aforementioned solids content is smaller than 0.001 mg/ml, an amount of the graphite material is too less, thereby wasting the organic solvent, thus increasing the cost. Moreover, a graphene layer made by subjecting the highly dispersed graphene organic dispersion to a coating process has a loose structure, thereby limiting the application region of the highly dispersed graphene organic dispersion. When the solids content is higher than 10.0 mg/ml, an amount of the graphite material is too much, thereby partial graphite material easily collects and stacks, thus hardly forming a dispersion graphene sheet, further lowering the yield of the following peeling process 120 and increasing the cost.

The aforementioned graphite material includes but is not limited a graphene powder, a graphene sheet having 3 nm to 20 nm of thickness, a multi-wall nano carbon tube, other suitable graphene materials and any combination thereof. In one embodiment, a particle size of the aforementioned graphene powder is 300 meshes.

According to the polarity of the highly dispersed graphene organic dispersion and the convenience of the working, the aforementioned organic solvent includes but is not limited alcohols, acids, amines, ketones, ethers, carboxamides, esters, pyrollidone solvents, alkyl solvents, aromatic solvents, other suitable solvents and any combination thereof, thereby adjusting the polarity of the highly dispersed graphene organic dispersion. The organic solvent can be used alone or in combination with two or more.

In one embodiment, the aforementioned organic solvent includes but is not limited alkene, halogenated alkene having 3 to 8 carbon atoms, aromatic having 6 to 9 carbon atoms, halogenated aromatic having 6 to 9 carbon atoms, other suitable organic solvents and any combination thereof.

For example, the organic solvent is an alkyl solvent having 3 to 8 carbon atoms, such as isooentane, cyclohexane, methyl cyclohexane and the like; a halogenated alkene solvent, such as chloro methane, dichloro methane, chloroform, tetrachloro carobon and the like; an aromatic solvent, such as benzene, toluene, xylene, m-xylene, o-xylene, p-xylene, trimethyl benzene and the like; a halogenated aromatic solvent, such as chlorobenzene, dichlorobenzene, trichlorobenzene, bromobenzene, dibromobenzene and the like.

When a peeling step of the aforementioned peeling process 120 is performed, the organic solvent will be evaporated to vapor by the high temperature, thereby increasing the pressure of the closed reaction tank, thus the vapor of the organic solvent is permeated into the graphite material. Then, when the temperature is decreased, thereby lowering the pressure of the closed reaction tank, thus the graphite material is peeled by the organic solvent molecule permeated into the graphite material, so as to form the graphene.

In one embodiment, the aforementioned mixture can selectively include a biphenyl compound. The biphenyl compound is a biphenyl with low molecular weight or a derivation compound thereof. The molecular weight of the biphenyl compound is 150 to 430. The aforementioned biphenyl compound includes but is not limited a compound, such as naphthalene, anthracene and phenanthrene which are an olefination or a functionalized compound. The biphenyl compound can include a single olefin functional group or two olefin functional groups, and the olefin functional group is a functional group having 1 to 6 carbon atoms.

For example, the biphenyl compound includes but is not limited olefination naphthalene, olefination anthracene, olefination phenanthrene and the like.

According to the aforementioned graphite material as 100 parts by weight, an amount of the aforementioned biphenyl compound is 0 to 2 parts by weight.

When a peeling step of the aforementioned peeling process 120 is performed, the organic solvent will be evaporated to vapor by the high temperature, thereby increasing the pressure of the closed reaction tank, thus the biphenyl compound is permeated into the graphite material. Then, when the temperature is decreased, thereby lowering the pressure of the closed reaction tank, thus the graphite material is also peeled by the biphenyl compound permeated into the graphite material, so as to form the graphene.

When the amount of the biphenyl compound is larger than 2 parts by weight, the redundant biphenyl compound will decrease a concentration and a purity of the highly dispersed graphene organic dispersion, thereby limiting the application of the highly dispersed graphene organic dispersion.

After the process 110 is performed, the aforementioned mixture is subjected to the peeling process 120. In the peeling process 120, the peeling step and a dispersion step is performed to the mixture in sequence as shown in processes 120a and 120b. In the peeling step, the aforementioned mixture is firstly disposed in the closed reaction tank to stir uniformly. Then, a temperature of the reaction tank is increased to a first temperature, and a reaction is reacted for 10 minutes to 4 hours, so as to for a uniform graphene solution. The first temperature is more than 5° C. to 50° C. above a boiling point of the aforementioned organic solvent.

When the aforementioned first temperature is smaller than the temperature which is higher than the boiling point of the organic solvent for 5° C., the organic solvent is hardly evaporated, thereby the organic solvent can not permeate the graphite material, thus the graphite material can not be peeled, further hardly forming the graphene. When the aforementioned first temperature is higher than the temperature that is higher than the boiling point of the organic solvent for 50° C., the organic solvent can all evaporate to the vapor. However, the pressure of the reaction tank is hardly controlled, thereby increasing the difficulty of the reaction.

The aforementioned first temperature preferably is higher than the boiling point of the organic solvent for 5° C. to 30° C., more preferably is 5° C. to 20° C.

When the reaction time of the peeling step is smaller than 10 minutes, the graphite material is not permeated incompletely by the vapor of the organic solvent and the biphenyl compound, thereby lowering the yield of the peeling step. When the reaction time of the peeling step is higher than 4 hours, the long reaction time will increase the time cost, thereby increase the cost of the energy.

In one embodiment, the peeling step is performed for 30 minutes to 4 hours.

In the aforementioned dispersion step, the graphene solution is further dispersed by a homogenizer at a second temperature and 1 atm, thereby increasing the dispersion of the graphene in the solvent. The second temperature is 5° C. to 40° C.

In one embodiment, when the aforementioned mixture selectively includes a biphenyl compound, the biphenyl compound can efficiently prevent the graphene from collecting, thereby increasing the dispersion of the graphene.

Since the graphite material is peeled non-mechanically and physically under a high temperature and a high pressure during the peeling process of the present invention, and there is neither chemical reaction nor organic acid solution involved in the peeling process, thereby obtaining the single-layered graphene. Therefore, the surface of the single-layered graphene has no additionally functional group and not be subjected to any surface treatment such as reduction or plasma surface treatment. Moreover, the production cost can be save more and the single-layered graphene has better characteristics and performance.

After the aforementioned peeling process 120 is completed, the highly dispersed graphene organic dispersion is formed as shown in a process 130. The highly dispersed graphene organic dispersion contains 75% or more of a single-layered graphene according to the total amount of all types of graphene, and the all types of graphene contain the single-layered graphene and multi-layered graphene. A graphene concentration in the highly dispersed graphene organic dispersion is 0.001 mg/ml to 10.0 mg/ml.

In one embodiment, the highly dispersed graphene organic dispersion of the present invention can produce a graphene layer, and the graphene layer is disposed on at least one surface of a substrate to form the graphene material. A light-shading rate of the graphene layer is 3% to 15%.

In one example, the highly dispersed graphene organic dispersion is coated on the aforementioned substrate to form the graphene layer, and the concentration of the highly dispersed graphene organic dispersion is 2 mg/ml. The light-shading rate of the graphene layer is 5%. Then, a second coating process is performed by the highly dispersed graphene organic dispersion to form the other graphene layer on the aforementioned graphene layer. The light-shading rate of the double-layers graphene layer is 8%.

For further increasing a film-forming ability of the graphene layer in the aforementioned graphene material, before the peeling process is performed, according to the hydrophile-lipophile ability of the substrate, the aforementioned organic solvent can be in combination of two or more to adjust the polarity of the highly dispersed graphene organic dispersion, thereby increasing the film-forming ability of the graphene layer on the substrate. In one embodiment, when a material of the substrate is polyethylene terephthalate (PET), the aforementioned organic solvent can be a mixing solvent of N-methyl pyrrolidinone (NMP) and toluene. A volume ratio of NMP to toluene is 1:99 to 99:1.

Several embodiments are described below to illustrate the application of the present invention. However, these embodiments are not used for limiting the present invention. For those skilled in the art of the present invention, various variations and modifications can be made without departing from the spirit and scope of the present invention.

Producing Highly Dispersed Graphene Organic Dispersion

Example 1

A mixture was firstly provided. The mixture included a graphene material and an organic solvent, and a solids content of the mixture was 0.1 mg/mi. The organic solvent was NMP (a volume percentage of the NMP and toluene was 100:0). Then, a peeling process was performed to the mixture, and a first temperature of the peeling process was higher than a boiling point of the organic solvent for 20° C. After the peeling process was performed for 20 minutes, the temperature was decreased to 10° C., and a dispersion step was performed by a homogenizer. After the dispersion step was performed for 10 minutes, the highly dispersed graphene organic dispersion was obtained. The resulted highly dispersed graphene organic dispersion was evaluated according to the following evaluation methods, and the results of the contents of the single-layered graphene and the light-shading rate were listed in Table 1. The evaluation method of the light-shading rate and the ratio of the single-layered graphene were described as follows.

Examples 2 to 7

Examples 2 to 7 were practiced with the same method as in Example 1 by using various kinds or amounts of the components for the highly dispersed graphene organic dispersion. The formulations and detection results thereof were listed in Table 1 rather than focusing or mentioning them in details.

Evaluation Methods

1. Light-Shading Rate

A transmittance ($T_1$) of the polyethylene terephthalate (PET) film was firstly measured. Then, the highly dispersed graphene organic dispersions of Examples 1 to 7 were respectively formed on a surface of the PET film by a spin-coating process, thereby obtaining the graphene material. The spin-coating process was performed once. And then, a transmittance ($T_2$) was measured by the same method, and the light-shading rate of the graphene layer of the graphene material was calculated according to the following formula (I):

$$\text{Light-Shading Rate of Graphene Layers (\%)} = \frac{|T_1 - T_2|}{T_2} \times 100\% \quad \text{(I)}$$

2. Microstructure

A microstructure of the highly dispersed graphene organic dispersion and a surface microstructure of the graphene layer of the graphene material were observed by a transmission electron microscopy and a scanning electron microscopy respectively.

3. Ratio of Single-Layered Graphene

The ratio of the single-layered graphene was calculated by naked eyes according to the aforementioned diagram of the transmission electron microscopy.

The compositions of the highly dispersed graphene organic dispersion and the evaluation results of the light-shading rate and the ratio of the single-layered graphene of the above Examples were shown in Table 1.

According to Table 1, the light-shading rate of the graphene layer produced by the highly dispersed graphene organic dispersion of the present invention is 3% to 15%.

Figure 2A:
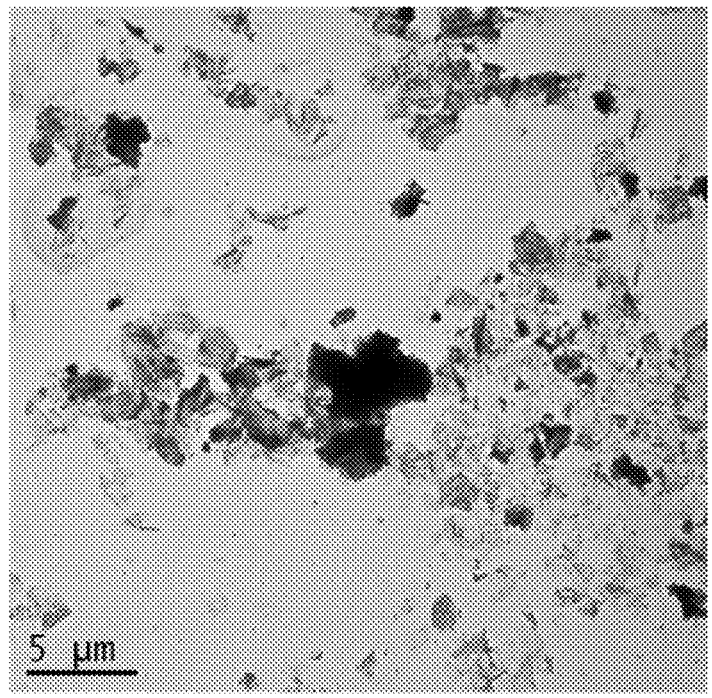
FIGS. 2a and 2b are diagrams of a transmission electron microscopy of a highly dispersed graphene organic dispersion produced according to Example 1 of the present invention.
Figure 2B:
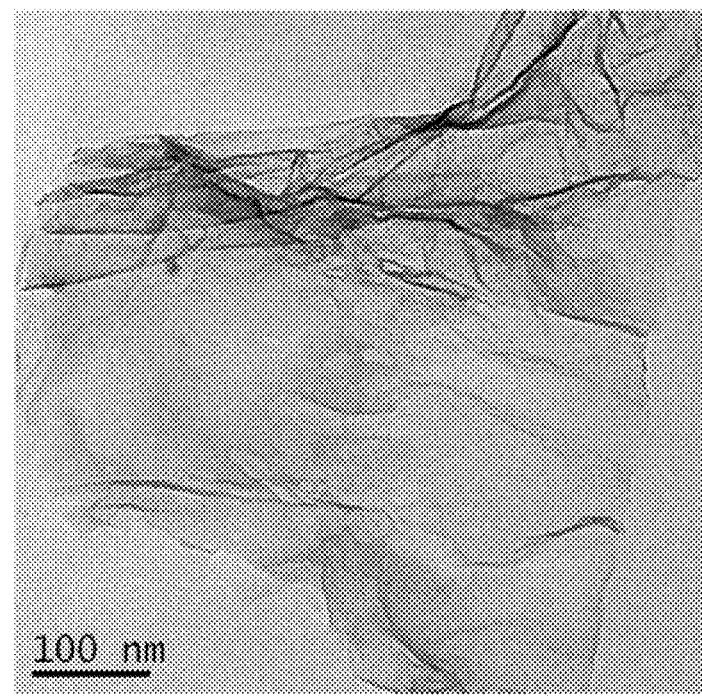
Figure 2C:
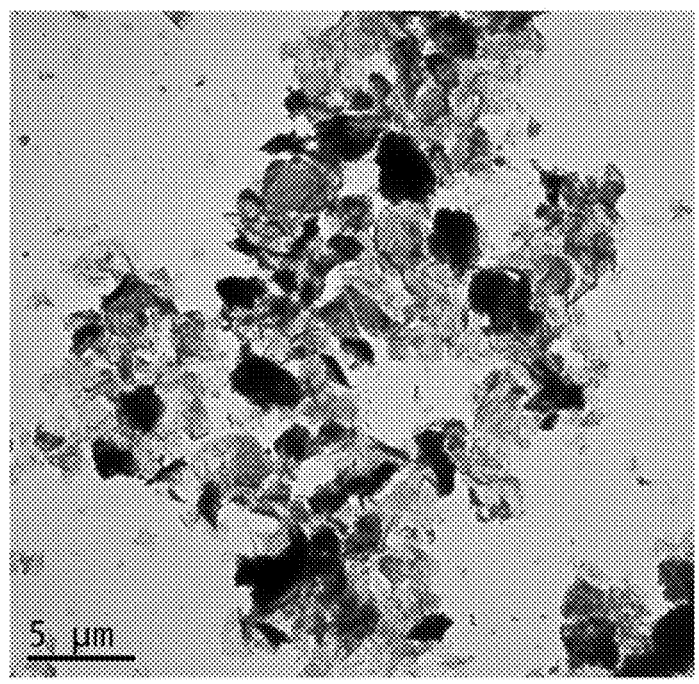
FIGS. 2c and 2d are diagrams of a transmission electron microscopy of a highly dispersed graphene organic dispersion produced according to Comparative Example 1 of the present invention.
Figure 2D:
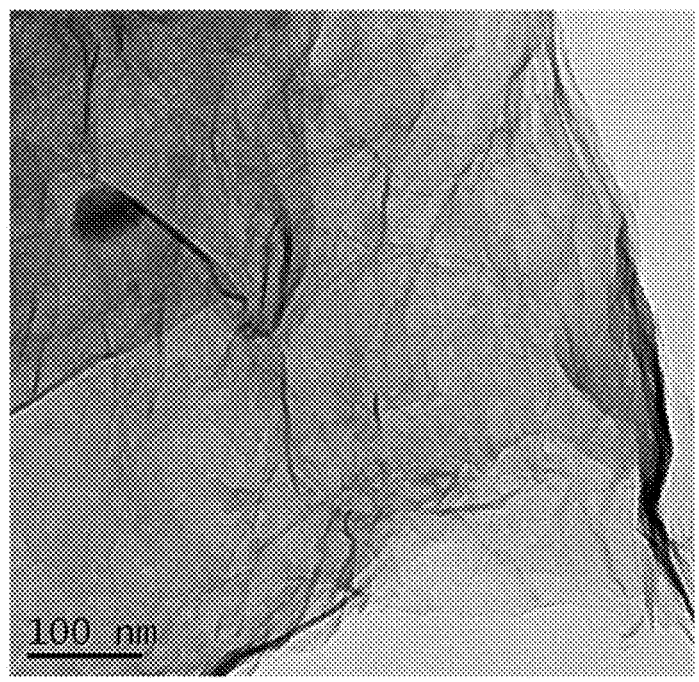
Figure 3A:
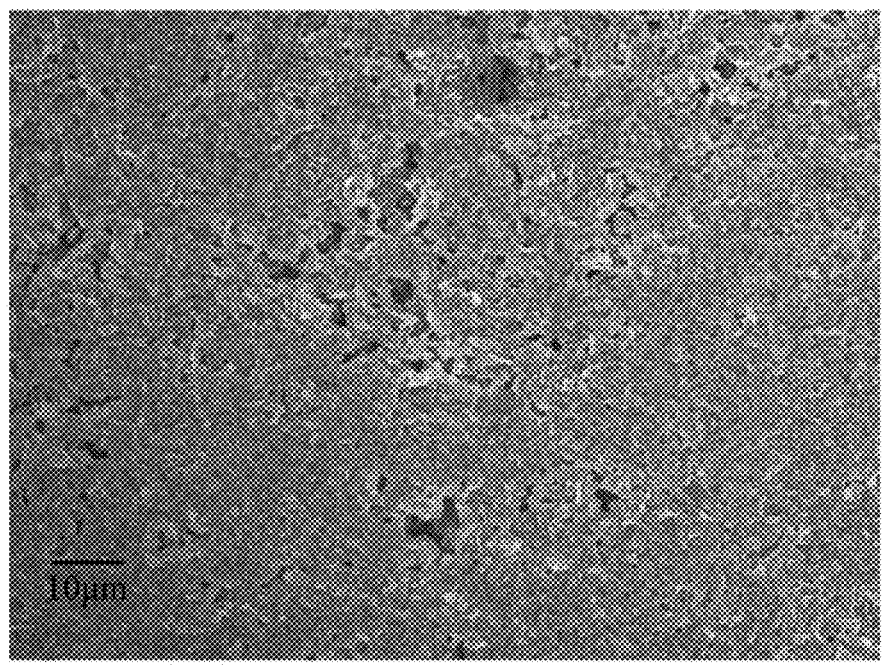
FIGS. 3a and 3b are diagrams of a scanning electron microscopy of a graphene material produced according to Example 1 of the present invention.
Figure 3B:
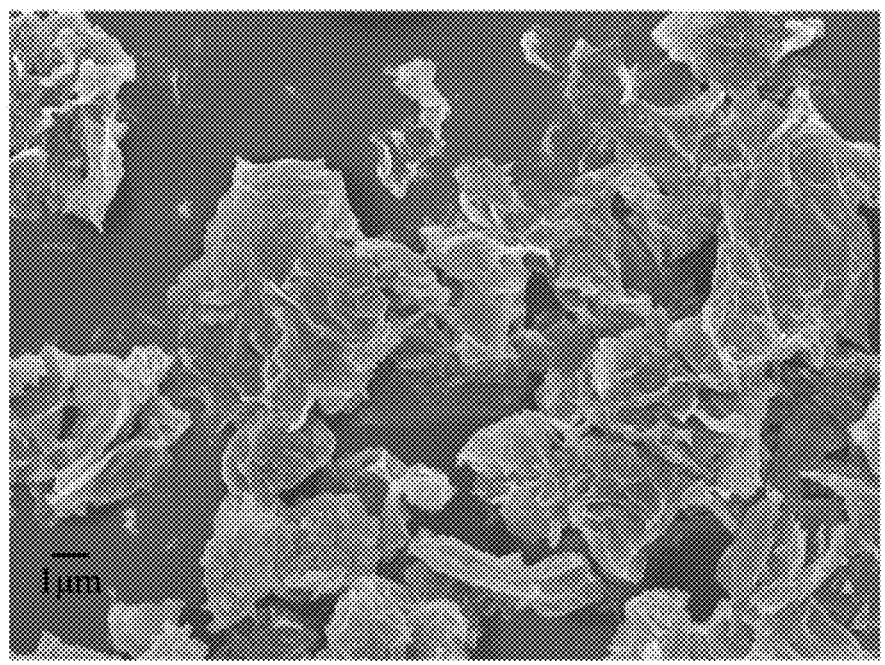
Figure 3C:
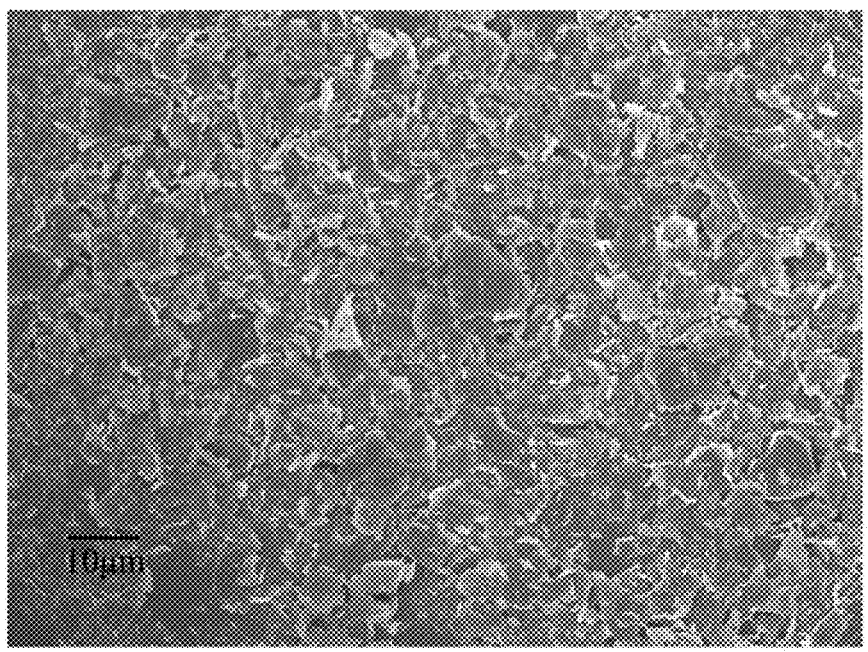
FIGS. 3c and 3d are diagrams of a scanning electron microscopy of a graphene material produced according to Comparative Example 1 of the present invention.
Figure 3D:
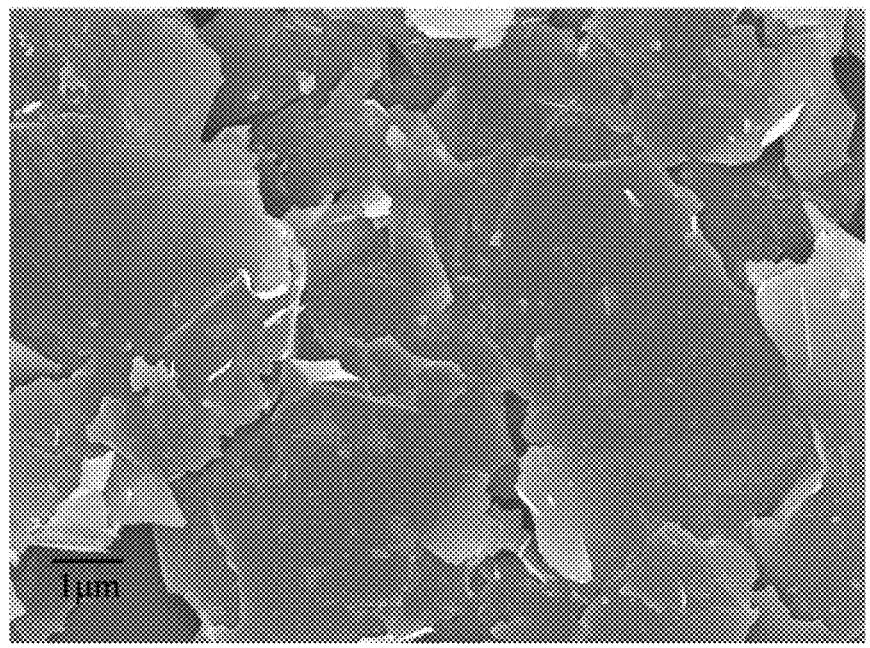

Moreover, reference is made to FIGS. 2a to 3d. FIGS. 2a and 2b are diagrams of the transmission electron microscopy of the highly dispersed graphene organic dispersion produced according to Example 1 of the present invention, and FIGS. 3a and 3b are diagrams of the scanning electron microscopy of the graphene material produced according to the same. FIGS. 2c and 2d are diagrams of the transmission electron microscopy of the highly dispersed graphene organic dispersion produced according to Comparative Example 1 of the present invention, and FIGS. 3c and 3d are diagrams of the scanning electron microscopy of the graphene material produced according to the same.

A length of the scale of the aforementioned FIGS. 2a and 2c is 5 μm, a length of the scale of FIGS. 2b and 2d is 100 nm, a length of the scale of FIGS. 3a and 3c is 10 μm, and a length of the scale of FIGS. 3b and 3d is 1 μm.

According to the aforementioned diagrams (FIGS. 2a to 2d) of the transmission electron microscopy, a distribution of the graphene in the highly dispersed graphene organic dispersion of Example 1 (shown as FIGS. 2a and 2b) is uniform, and the highly dispersed graphene organic dispersion contains 75% or more of a single-layered graphene according to the total amount of all types of graphene, and the all types of graphene contain the single-layered graphene and multi-layered graphene; the graphene in the highly dispersed graphene organic dispersion of Comparative Example 1 (shown as FIGS. 2c and 2d) is a multi-layered stacking structure.

According to the aforementioned diagrams (FIGS. 3a to 3d) of the scanning electron microscopy, a distribution of the graphene in the graphene layer of Example 1 (shown as FIGS. 3a and 3b) is uniform. A surface of the graphene is a wrinkling structure, and the graphene has a single-layered structure. Although a distribution of the graphene in the graphene layer of Comparative Example 1 (shown as FIGS. 3c and 3d) is uniform, the graphene of Comparative Example 1 is a multi-layered stacking structure.

Figure 4:
FIG. 4 is a picture that a highly dispersed graphene organic dispersion produced according to Example 1 of the present invention stands at room temperature and 1 atm after three weeks.

Reference is made to FIG. 4, which is the picture that the highly dispersed graphene organic dispersion produced according to Example 1 of the present invention stands at room temperature and 1 atm after three weeks. A volume of the highly dispersed graphene organic dispersion is 400 ml. According to FIG. 4, after the highly dispersed graphene organic dispersion is stood for three weeks, the highly dispersed graphene organic dispersion is not a layered solution and the graphene does not collect to precipitate. Therefore, the highly dispersed graphene organic dispersion of the present invention has a better ageing stability.

According to the aforementioned Examples, the advantage of the highly dispersed graphene organic dispersion and the application thereof is that the highly dispersed graphene organic dispersion is produced by the vapor of the organic solution and the peeling process, thereby obtaining the single-layered graphene. The highly dispersed graphene organic dispersion contains 75% or more of a single-layered graphene according to the total amount of all types of graphene, and the all types of graphene contain the single-layered graphene and multi-layered graphene. Moreover, there are not functional groups and structure defects on the surface of the graphene, thus without reduction reaction, further having a better photoelectrical performance. The light-shading rate of the graphene is 3% to 15%.

Furthermore, after the highly dispersed graphene organic dispersion is stood at room temperature and 1 atm for three weeks, the graphene still has a well distribution and does not precipitate, thereby the graphene has a better aging stability.

As is understood by a person skilled in the art, the foregoing preferred embodiments of the present invention are illustrated of the present invention rather than limiting of the present invention. In view of the foregoing, it is intended to cover various modifications and similar arrangements included within the spirit and scope of the appended claims. Therefore, the scope of which should be accorded the broadest interpretation so as to encompass all such modifications and similar structure.

TABLE 1

| | | Example | | | | | | |
|---|---|---|---|---|---|---|---|---|
| | | 1 | 2 | 3 | 4 | 5 | 6 | 7 |
| Concentration of Graphene Material (mg/ml) | | 0.1 | 0.5 | 1 | 2 | 4 | 4 | 4 |
| Ratio of NMP and Toluene (vol %) | | 100:0 | 100:0 | 100:0 | 100:0 | 100:0 | 80:20 | 50:50 |
| Biphenyl Compound (wt %) | | | | 0.1 | 0.3 | 0.5 | 0.5 | 0.5 |
| Peeling Step | Difference Between First Temperature and Boiling Point of Organic solvent (° C.) | 20 | 20 | 30 | 35 | 40 | 40 | 40 |
| | Time (min) | 20 | 30 | 30 | 60 | 120 | 120 | 120 |
| Dispersing Step | Second Temperature (° C.) | 10 | 10 | 10 | 10 | 10 | 10 | 10 |
| | Time (min) | 10 | 20 | 20 | 20 | 30 | 30 | 30 |
| Evaluation Method | Ratio of Single-layered Graphene (%) | 85 | 82 | 79 | 77 | 75 | 77 | 75 |
| | Light-shading Rate (%) | 3 | 4 | 6 | 8 | 13 | 18 | 20 |

What is claimed is:

1. A method of producing highly dispersed graphene organic dispersion, comprising:
   providing a mixture, wherein the mixture includes a graphite material and an organic solvent, and a solids content of the mixture is 0.001 mg/ml to 10.0 mg/ml; and
   performing a peeling process to the mixture, wherein the peeling process includes:
      performing a peeling step to the mixture in a closed reaction tank at a first temperature for 10 minutes to 4 hours, so as to form a graphene solution, wherein the first temperature is more than 5° C. to 50° C. above a boiling point of the organic solvent; and
      performing a dispersing step to the graphene solution at a second temperature, so as to form the highly dispersed graphene organic dispersion, wherein the second temperature is 5° C. to 40° C., and the highly dispersed graphene organic dispersion contains 75% and more of a single-layered graphene.

2. The method of producing the highly dispersed graphene organic dispersion of claim 1, wherein the organic solvent is selected from the group consisting of an alkene solvent, a halogenated alkene solvent having 3 to 8 carbon atoms, an aromatic solvent having 6 to 9 carbon atoms, a halogenated aromatic solvent having 6 to 9 carbon atoms and any combination thereof.

3. The method of producing the highly dispersed graphene organic dispersion of claim 1, wherein the mixture further includes a biphenyl compound, and based on the graphite material as 100 parts by weight, an amount of the biphenyl compound is 0 to 2 parts by weight.

4. The method of producing the highly dispersed graphene organic dispersion of claim 3, wherein the biphenyl compound is an olefinic biphenyl compound.

5. The method of producing the highly dispersed graphene organic dispersion of claim 3, wherein a molecular weight of the biphenyl compound is 150 to 430.

6. The method of producing the highly dispersed graphene organic dispersion of claim 1, wherein the first temperature is higher than the boiling point of the organic solvent for 5° C. to 30° C.

7. The method of producing the highly dispersed graphene organic dispersion of claim 1, wherein the peeling step is performed for 30 minutes to 4 hours.

* * * * *